US007947904B2

(12) United States Patent
Watanabe

(10) Patent No.: US 7,947,904 B2
(45) Date of Patent: May 24, 2011

(54) CONDUCTOR AND WIRE HARNESS

(75) Inventor: Kunihiko Watanabe, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 464 days.

(21) Appl. No.: 11/885,152

(22) PCT Filed: Mar. 31, 2006

(86) PCT No.: PCT/JP2006/306943

§ 371 (c)(1),
(2), (4) Date: Aug. 27, 2007

(87) PCT Pub. No.: WO2006/106971

PCT Pub. Date: Oct. 12, 2006

(65) Prior Publication Data

US 2009/0229880 A1 Sep. 17, 2009

(30) Foreign Application Priority Data

Apr. 1, 2005 (JP) ................................ 2005-106246

(51) Int. Cl.
*H02G 15/02* (2006.01)

(52) U.S. Cl. .................... 174/72 A; 174/74 R; 174/94 R

(58) Field of Classification Search ................ 174/84 R, 174/84 C, 78, 74 R, 85; 439/98, 877, 882, 439/874

See application file for complete search history.

(56) References Cited

U.S. PATENT DOCUMENTS 2,806,215 A * 9/1957 Redslob ........................ 439/868
3,020,333 A 2/1962 Bangert et al.
4,038,743 A * 8/1977 DuRocher et al. .............. 29/869
4,114,014 A 9/1978 Shogo et al.
4,310,719 A * 1/1982 Cross et al. ................. 174/94 R
4,949,454 A * 8/1990 Schauer et al. ................. 29/860
5,231,758 A * 8/1993 Schauer .......................... 29/856
6,538,203 B1 * 3/2003 Nolle et al. ................. 174/84 R

FOREIGN PATENT DOCUMENTS

| | | | |
|---|---|---|---|
| CH | 245 503 | A | 7/1947 |
| DE | 26 49 534 | C2 | 10/1982 |
| DE | 695 04 216 | T2 | 2/1999 |
| DE | 199 08 031 | A1 | 9/2000 |
| DK | DD 148 411 | A1 | 5/1981 |
| JP | U 51-118077 | | 9/1976 |
| JP | 63-143862 | * | 9/1988 |

(Continued)

OTHER PUBLICATIONS

Japanese Office Action in Japanese Patent Application No. 2007-511204 dated Mar. 18, 2010 with English Translation.

(Continued)

*Primary Examiner* — William H Mayo, III
(74) *Attorney, Agent, or Firm* — Oliff & Berridge, PLC

(57) ABSTRACT

One aspect of the present invention can include a conductor to be installed on a vehicle for high current use including a stranded copper wire connected to an end portion of a single-core aluminum cable, an intermediary conductor made of copper is connected to the stranded copper wire, and an end face of a core of the single-core aluminum cable is cold welded connected to an end face of a welding shaft formed on the intermediary conductor having approximately a same diameter as the core of the single-core aluminum cable.

13 Claims, 16 Drawing Sheets

FOREIGN PATENT DOCUMENTS

| | | |
|---|---|---|
| JP | U 63-143862 | 9/1988 |
| JP | A 5-54949 | 3/1993 |
| JP | A 2004-111058 | 4/2004 |

OTHER PUBLICATIONS

May 17, 2010 Chinese Office Action issued in Chinese Patent Application No. 200680010511.5 (with translation).

Aug. 31, 2010 Japanese Office Action issued in Japanese Patent Application No. 2007-511204.

Sep. 2, 2010 Japanese Office Action issued in Japanese Patent Application No. 2007-511204, with English translation.

German Office Action dated Oct. 14, 2010 for German Patent Application No. 11 2006 000 768.8-34 (with translation).

* cited by examiner

CONDUCTOR AND WIRE HARNESS

TECHNICAL FIELD

The present invention relates to a conductor and a wire harness.

BACKGROUND ART

In an electric vehicle, a high current passes through the electric wires used for a propulsion motor circuit. Therefore, there has been proposed that a conductor with a larger cross-sectional area is used as an electric wire for the propulsion motor circuit in order to suppress heat generation of the electric wire. However, the conductor with a larger cross-sectional area is heavier, which is undesirable from the perspective of acceleration performance or fuel efficiency.

In order to lighten the electric wires in view of the circumstances, a single-core aluminum cable with a little specific gravity can be used for a wiring path that is almost linearly arranged and forms a relatively long path. A stranded copper wire, which is suitable for bending deformation in spite of a larger specific gravity than aluminum, can be used for a wiring path that is windingly arranged and forms a relatively short path.

If connection between dissimilar metals should be formed like the above case, a cold welding method, which brings the end faces of two conductors into abutting contact with each other and forms a bond therebetween with pressure, is available in consideration of electrical corrosion prevention.

A cold welding method for connecting between conductors is described in Patent Document 1, for example.

Patent Document 1: JP05-54949

However, if one of two conductors is formed of a stranded wire composed by twisting small-gauge wires, the one conductor is prone to buckling deformation. Therefore it is difficult to bring the end faces of the two conductors into abutting contact with each other and form a bond therebetween with pressure, in this case.

Thus, there is a need in the art to enable connection between two conductors made of dissimilar metals achieving electrical corrosion prevention in the case that one of the conductors is prone to buckling deformation.

SUMMARY OF THE PRESENT INVENTION

One aspect of the present invention can include a conductor to be installed on a vehicle for high current use comprising, a single-core aluminum cable, a stranded copper wire having flexibility and being connected to an end portion of said single-core aluminum cable, and an intermediary conductor made of copper and connected to said stranded copper wire. An end face of a core of said single-core aluminum cable is cold welded to an end face of a welding shaft formed on said intermediary conductor and having approximately a same diameter as the core of said single-core aluminum cable.

According to this construction, the single-core aluminum cable and the stranded copper wire, i.e., dissimilar metals are connected via the intermediary conductor. Although the single-core aluminum cable and the intermediary conductor are made of dissimilar metals to each other, electrical corrosion in the junctional region between the end faces thereof can be prevented, because metallic bond between the end faces is formed by cold welding. On the other hand, the stranded copper wire and the intermediary conductor are made of similar metals. Therefore electrical corrosion will not occur, even if a gap allowing water intrusion is made in the junctional region therebetween. Accordingly, a connecting method for between the stranded copper wire and the intermediary conductor can be selected, ignoring consideration of preventing water intrusion into the junctional region, on the ground that the stranded copper wire is prone to buckling deformation, so that the two can be reliably connected.

EXPLANATION OF SYMBOLS

Wa, Wb, Wc, Wd, We, Wf, Wg . . . Conductor
10, 70, 90, 100 . . . First conductor
12, 32, 43, 53 . . . Welding surface (Flat surface)
20 . . . Second conductor
30, 40, 50, 60, 80, 110 . . . Intermediary conductor
31, 42, 52, 62 . . . Welding portion (Welding shaft)
33, 47, 65, 81, 111 . . . Crimping portion (Connecting portion)
35, 47*b*, 67, 83, 113 . . . Clamping piece (Clamping portion)
H . . . Wire Harness

DETAILED DESCRIPTION OF THE EMBODIMENTS

First Embodiment

Figure 1:
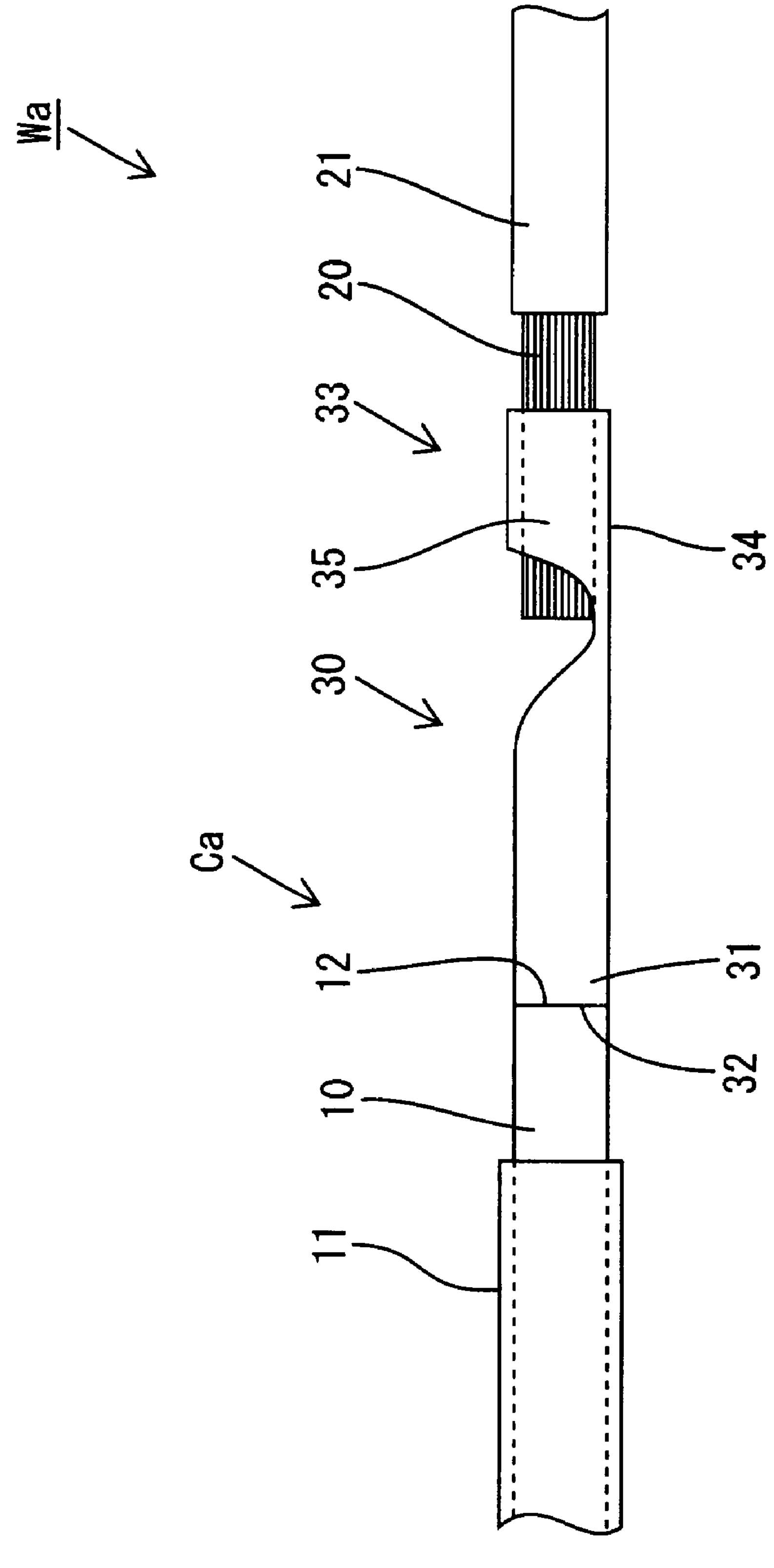
FIG. 1 is a side view of a conductor according to a first embodiment.
Figure 2:
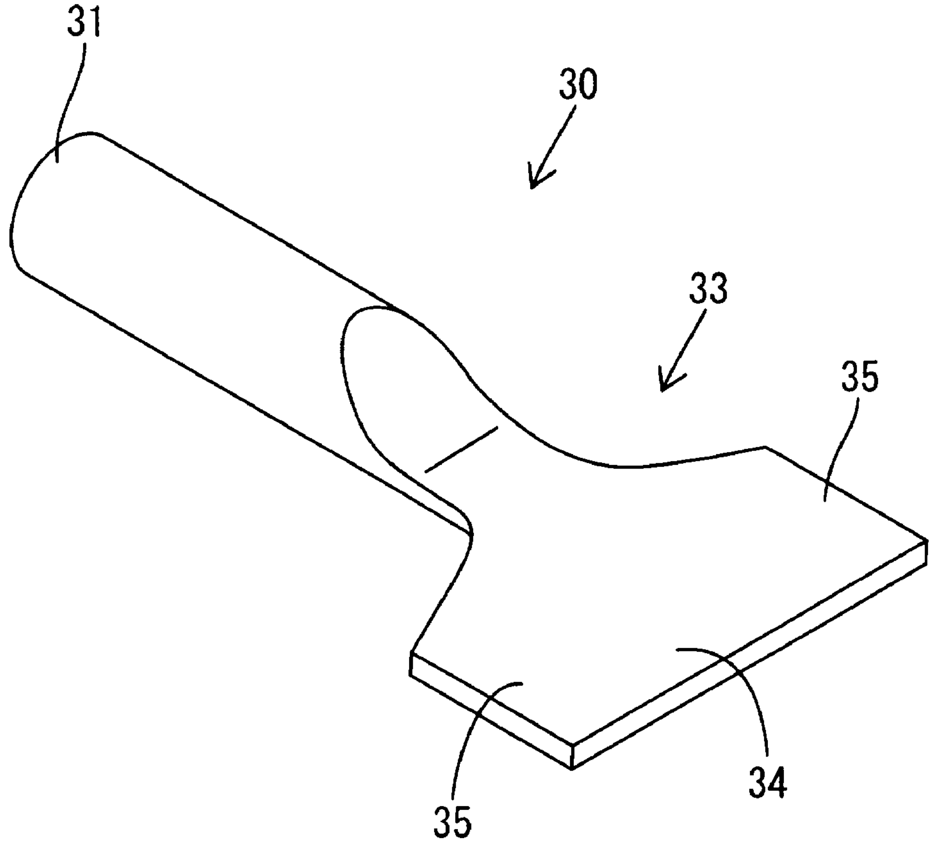
FIG. 2 is a perspective view of a manufacturing process of an intermediary conductor.
Figure 3:
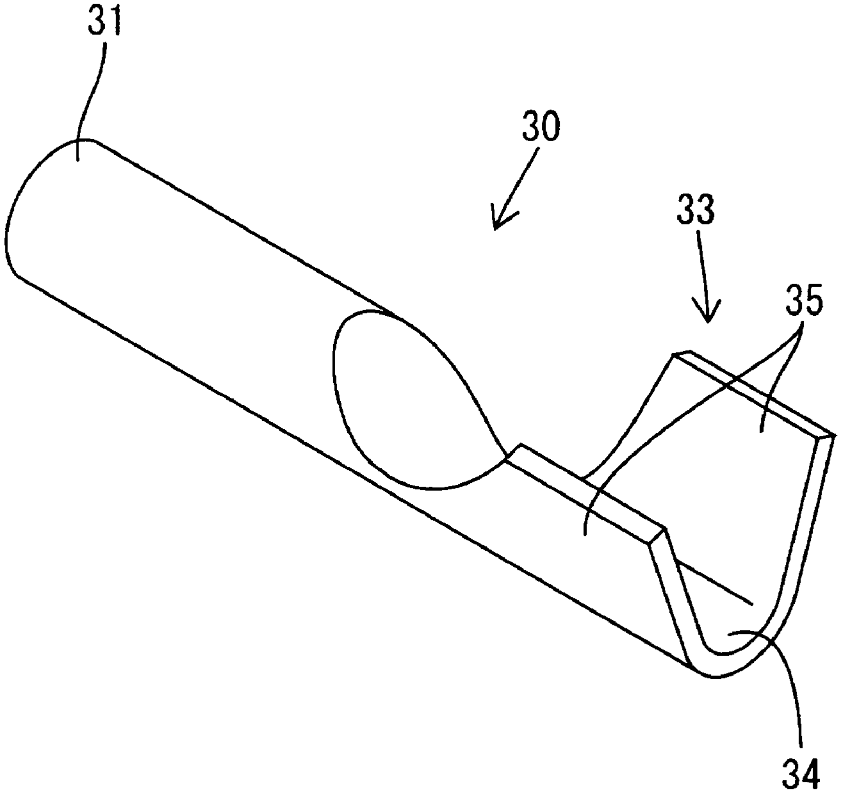
FIG. 3 is a perspective view of the intermediary conductor.

Hereinafter, a first embodiment according to the present invention will be explained with reference to FIGS. 1 through 3. In a conductor Wa of the present embodiment, an end portion of a first conductor 10 (corresponding to a single-core aluminum cable of the present invention), which is elongated and made of an aluminum alloy, and an end portion of a second conductor 20 (corresponding to a stranded copper wire of the present invention and a stranded core of the present invention), which is elongated and made of a copper alloy (i.e., made of a dissimilar metal to the first conductor 10), are connected using an intermediary conductor 30.

The first conductor 10 has a circular cross section, and is formed of a single-core cable that has a constant outer diameter almost over its entire length. An insulating coating 11 made of a synthetic resin surrounds the periphery of the first conductor 10. An end portion of the first conductor 10 is exposed to the outside of the insulating coating 11. The end face on the exposed side of the first conductor 10 forms a welding surface 12 (corresponding to a flat surface of the present invention), which is a flat surface substantially at right angles to the axis of the first conductor 10.

The second conductor 20 is formed of a stranded wire, which is composed by spirally twisting small-gauge wires, and has a constant outer diameter almost over its entire length. The outer diameter of the second conductor 20 is approximately equal to the outer diameter of the first conductor 10. An insulating coating 21 made of a synthetic resin surrounds the periphery of the second conductor 20, and an end portion of the second conductor 20 is exposed to the outside of the insulating coating.

The intermediary conductor 30 is made of a similar metal to the second conductor 20, that is, made of a copper alloy, and forms a bar shape of a circular cross section as a whole. The outer diameter of the intermediary conductor 30 is approximately equal to the outer diameter of the first conductor 10. The proximal end portion of the intermediary conductor 30 forms a welding portion 31 (corresponding to a welding shaft of the present invention), and the end face of the welding portion 31 forms a welding surface 32 (corresponding to a flat surface of the present invention) which is a flat surface substantially at right angles to the axis of the intermediary conductor 30. A crimping portion 33 (corresponding to a connecting portion of the present invention) is integrally formed on the distal end portion of the intermediary conductor 30 (i.e., the end portion on the opposite side of the welding portion 31). The crimping portion 33 is formed by pressing the end portion of a bar shape having a circular cross section into a flat plate as shown in FIG. 2, and thereafter bending the flat plate so that the across-the-width middle of the flat plate forms substantially a circular arc and each lateral side edge portion thereof forms an upward sloping extension. Thus the crimping portion 33 is formed into an open-barrel shape, in which a pair of clamping pieces 35 (corresponding to a clamping portion of the present invention) extend upwardly from the respective lateral side edges of a curved bottom plate 34.

The welding surfaces 12, 32 are brought into abutting contact with each other, and the first conductor 10 and the intermediary conductor 30 are coaxially joined by cold welding (i.e., joined with pressure). Thereby the first conductor 10 and the intermediary conductor 30 are almost linearly connected in alignment with each other so as to form a bar shape. Thus the intermediary conductor 30 and the first conductor 10 are joined with pressure, so that a connecting structure Ca is formed.

On the other hand, when the intermediary conductor 30 and the second conductor 20 are to be connected, the second conductor 20 is first directed so that the axis thereof becomes substantially parallel to the welding portion 31. Then the second conductor 20 is moved in the radial direction thereof (i.e., moved downwards) so as to approach the crimping portion 33, and placed on the bottom plate 34 so as to be sandwiched between the two clamping pieces 35. Thereafter the clamping pieces 35 are clamped and thereby plastic deformation is caused, so that the clamping pieces 35 curl inward and wrap around the second conductor 20. Consequently, the end portion of the second conductor 20 and the crimping portion 33 are connected conductively and concentrically. The first conductor 10 and the second conductor 20 are thus connected via the intermediary conductor 30, so that the conductor Wa is completed.

According to the present embodiment, the first conductor 10 and the second conductor 20 are connected via the intermediary conductor 30. Although the first conductor 10 and the intermediary conductor 30 are made of dissimilar metals to each other, electrical corrosion in the junctional region between the end faces 12, 32 can be prevented, because metallic bond is formed by cold welding. On the other hand, connection between the second conductor 20 and the intermediary conductor 30 is formed by plastic deformation of the clamping pieces 35 of the crimping portion 33. Thereby the second conductor 20 and the intermediary conductor 30 can be reliably connected, although the second conductor 20 is formed of a stranded wire prone to buckling deformation. As for the crimping portion, there is a possibility that a gap allowing water intrusion may be formed between the second conductor 20 and the intermediary conductor 30. However, electrical corrosion will not occur, because the second conductor 20 and the intermediary conductor 30 are made of similar metals.

When the second conductor 20 and the intermediary conductor 30 are to be connected, the second conductor 20 is radially moved so as to approach the open-barrel crimping portion 33, and thereby placed thereon. Therefore the second conductor 20 is not necessary to be positioned with high precision, when placed on the crimping portion 33. Accordingly, an automatic machine can be used for easy crimping.

The crimping portion 33 is formed by pressing the bar-like end portion of the intermediary conductor 30 into a flat plate and thereafter bending the flat plate. That is, it is formed as an integral part of the intermediary conductor 30. Thus the number of members is reduced, compared to when the crimping portion 33 is formed as a part separated from the intermediary conductor 30.

The intermediary conductor 30 includes the crimping portion 33, and thereby the second conductor 20 can be formed of a stranded wire. The second conductor 20 formed of a stranded wire is easy to arrange windingly, compared to when it is formed of a single-core cable.

The first conductor 10 is made of an aluminum alloy with a relatively little specific gravity. Therefore, in view of weight reduction in the conductor Wa, the first conductor 10 is suitable for a wiring path that is almost linearly arranged and forms a relatively long path (e.g., in an electric vehicle, a wiring path connected between an inverter in the front body and a battery in the rear body, and arranged under and along the vehicle floor). On the other hand, the second conductor 20 is made of a copper alloy, which is easy to bend in spite of a larger specific gravity. Therefore it is suitable for a wiring path that is windingly arranged in a small space (e.g., the engine compartment of an electric vehicle) and forms a short path. It is not seriously detrimental to weight reduction in the conductor Wa.

Second Embodiment

Figure 4:
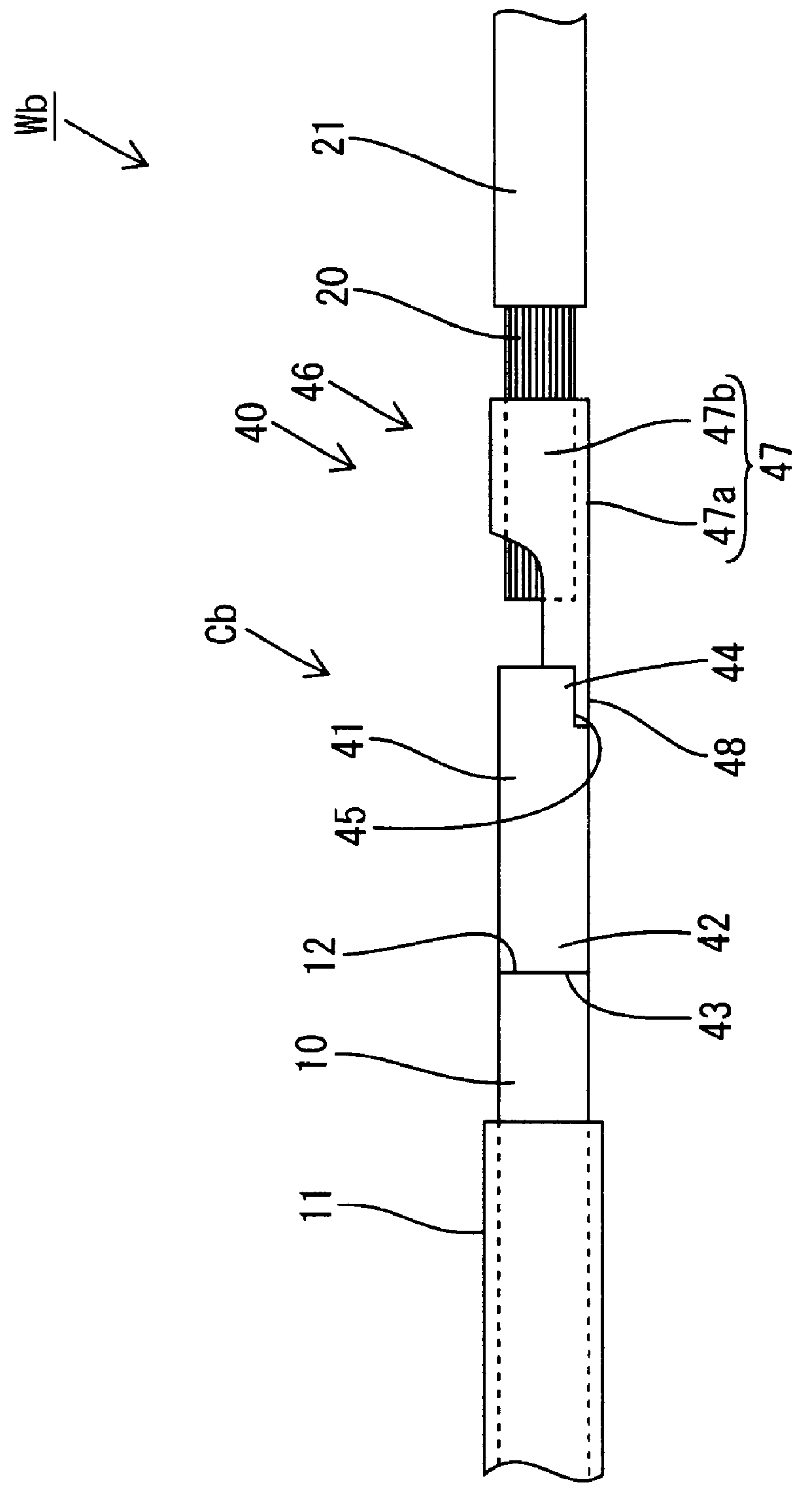
FIG. 4 is a side view of a conductor according to a second embodiment.
Figure 5:
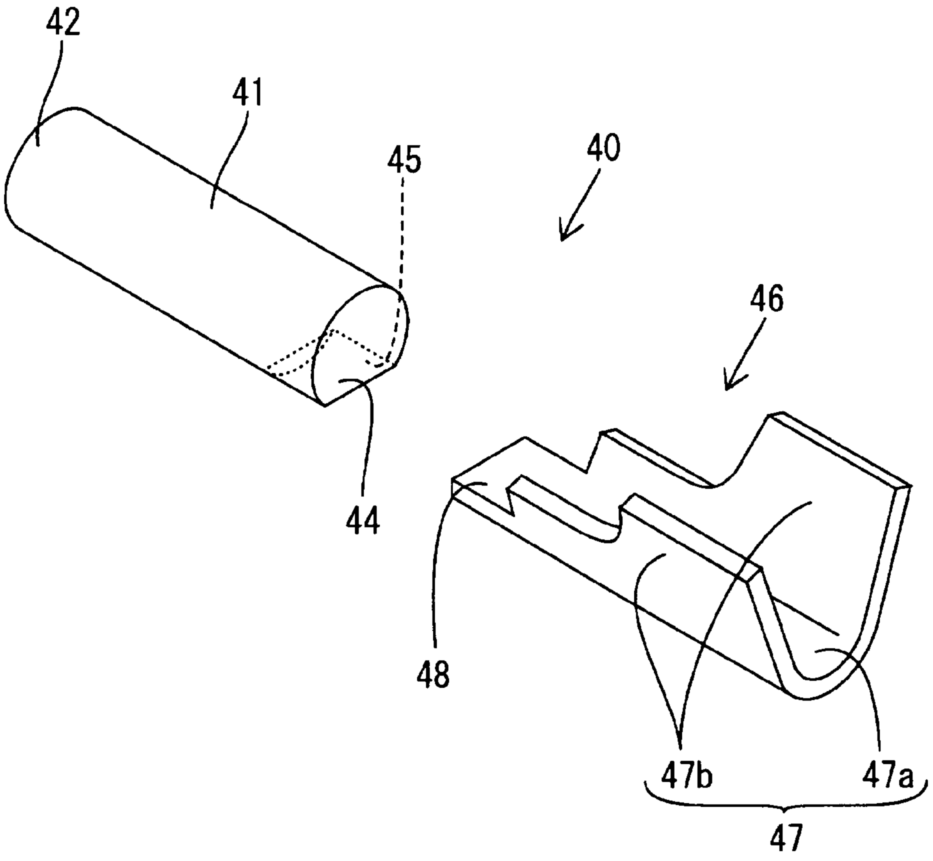
FIG. 5 is a perspective view of a separated state of an intermediary conductor according to the second embodiment.

Hereinafter, a second embodiment of the present invention will be explained with reference to FIGS. 4 and 5. A first conductor 10 and a second conductor 20 constituting a conductor Wb of the present embodiment are the same as those of the first embodiment, and therefore the same constructions are designated by the same symbols. The operation and effect are also the same as the first embodiment, and therefore explanation thereof is omitted.

An intermediary conductor 40 for connecting between the first conductor 10 and the second conductor 20 includes a body 41, which forms a bar shape of a circular cross section as a whole, and further includes a crimping member 46 manufactured as a part separated from the body 41. The body 41 and the crimping member 46 are both made of similar metals to the second conductor 20, i.e., made of copper alloys. The outer diameter of the body 41 is approximately equal to the outer diameter of the first conductor 10. The proximal end portion of the body 41 forms a welding portion 42 (corresponding to a welding shaft of the present invention). The end face of the welding portion 42 forms a welding surface 43 (corresponding to a flat surface of the present invention) which is a flat surface substantially at right angles to the axis of (the body 41 of) the intermediary conductor 40. On the distal end portion of the body 41 (i.e., the end portion on the opposite side of the welding portion 42), a joining portion 44 is formed as a depression by partially removing the outer bottom side of the end portion. A joining surface 45, which is a flat surface substantially parallel to the axis of the body 41, is formed on the joining portion 44. The crimping member 46 is formed by bending a board shaped into a predetermined geometry. The crimping member 46 includes an open-barrel crimping portion 47 (corresponding to a connecting portion of the present invention), in which a pair of clamping pieces **47*b* (corresponding to a clamping portion of the present invention) extend upwardly from the respective lateral side edges of a curved bottom plate 47*a*, and further includes a joint plate 48 contiguous to the proximal end of the bottom plate 47*a* of the crimping portion 47**.

The body 41 and the crimping member 46 are engaged so that the joint plate 48 is brought into surface-to-surface contact with the joining surface 45 of the joining portion 44 of the body 41. The engaged portions are joined by pressure welding such as cold welding (i.e., joined with pressure). Thus the intermediary conductor 40 is completed. The welding surfaces 12, 42 are brought into abutting contact with each other, and the first conductor 10 and the intermediary conductor 40 are coaxially joined by cold welding (i.e., joined with pressure). Thereby the first conductor 10 and the body 41 are almost linearly connected in alignment with each other so as to form a bar shape. Thus the intermediary conductor 40 and the first conductor 10 are joined with pressure, so that a connecting structure Cb is formed. The intermediary conductor 40 (crimping portion) and the second conductor 20 are connected (i.e., crimped) in the same manner as the first embodiment, and therefore explanation thereof is omitted.

Third Embodiment

Figure 6:
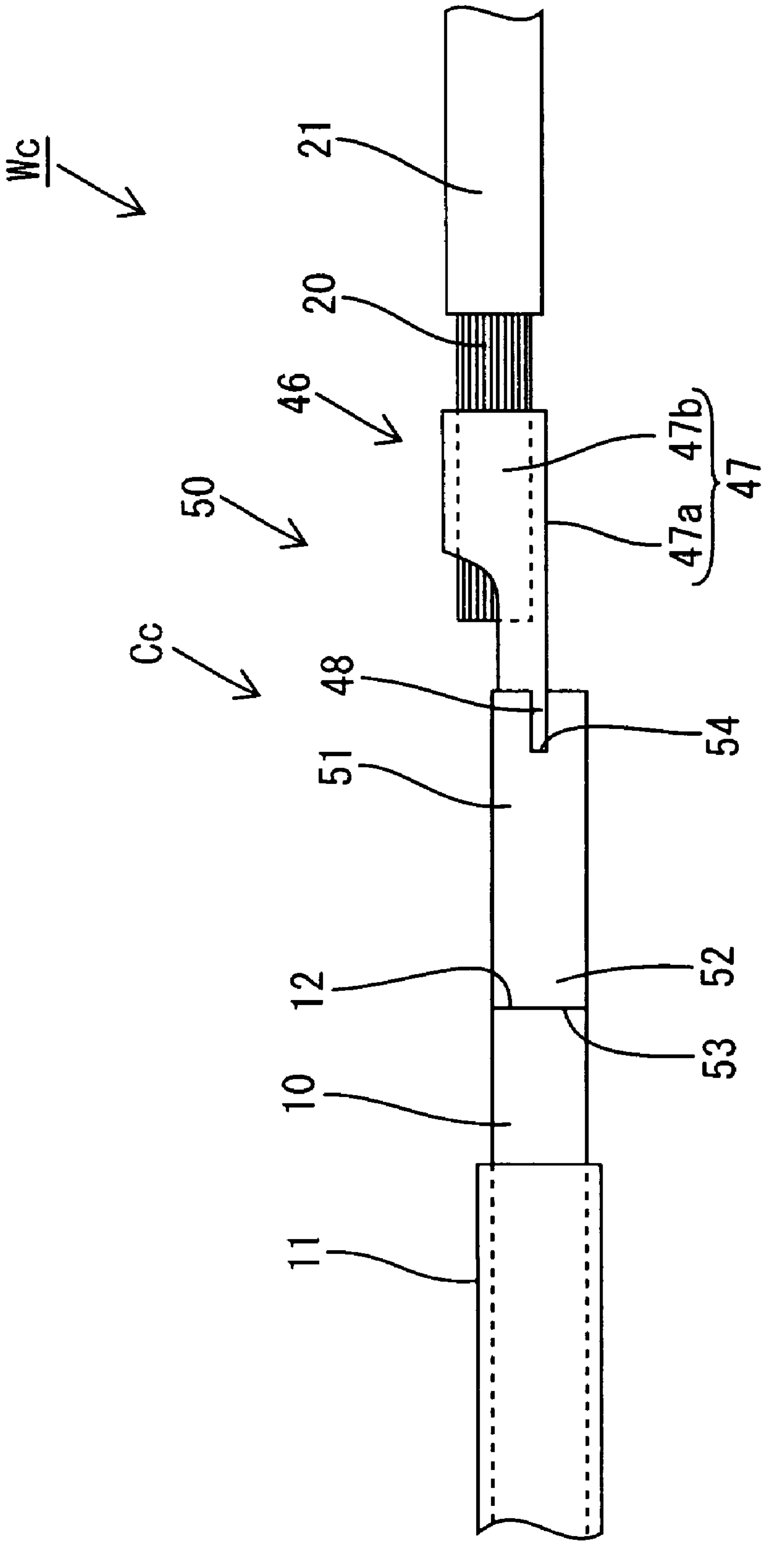
FIG. 6 is a side view of a conductor according to a third embodiment.
Figure 7:
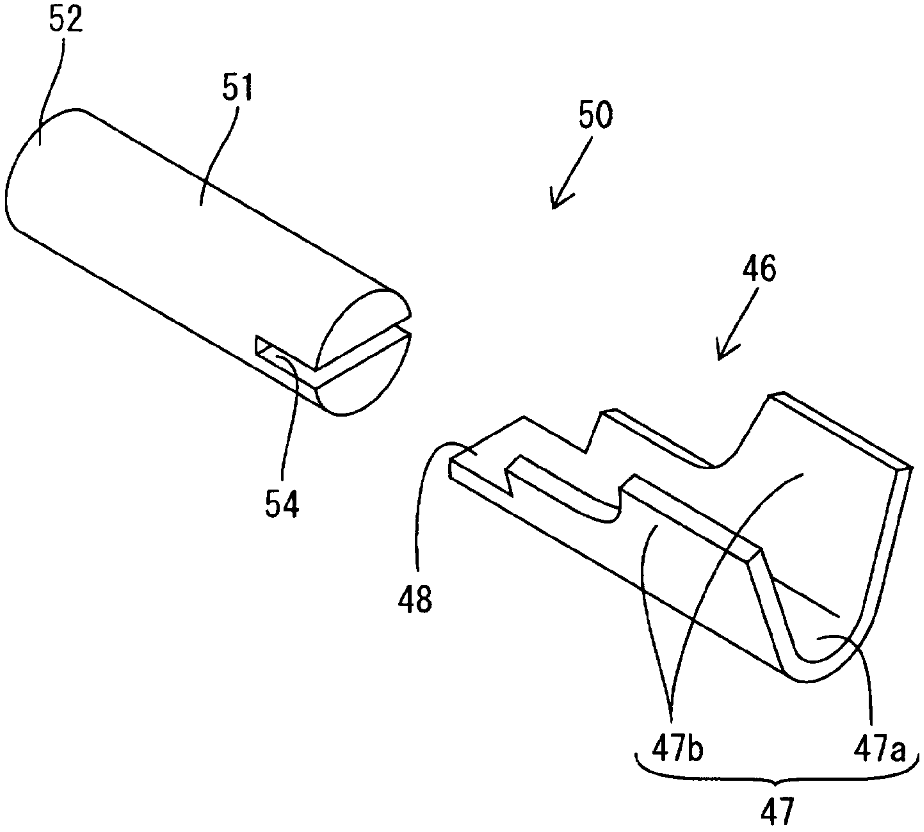
FIG. 7 is a perspective view of a separated state of an intermediary conductor according to the third embodiment.

Hereinafter, a third embodiment of the present invention will be explained with reference to FIGS. 6 and 7. A first conductor 10 and a second conductor 20 constituting a conductor Wc of the present embodiment are the same as those of the first and second embodiments, and therefore the same constructions are designated by the same symbols. The operation and effect are also the same as the first embodiment, and therefore explanation thereof is omitted.

An intermediary conductor 50 includes a body 51, which forms a bar shape of a circular cross section as a whole, and further includes a crimping member 46 manufactured as a part separated from the body 51. The body 51 and the crimping member 46 are both made of similar metals to the second conductor 20, i.e., made of copper alloys. The outer diameter of the body 51 is approximately equal to the outer diameter of the first conductor 10. The proximal end portion of the body 51 forms a welding portion 52 (corresponding to a welding shaft of the present invention). The end face of the welding portion 52 forms a welding surface 53 (corresponding to a flat surface of the present invention) which is a flat surface substantially at right angles to the axis of (the body 51 of) the intermediary conductor 50. On the distal end portion of the body 51 (i.e., the end portion on the opposite side of the welding portion 52), a joining portion 54 is formed as a slit by partially removing the end portion beginning with the end face and substantially parallel to the axis of the body 51. The crimping member 46 is the same as that of the second embodiment, and therefore designated by the same symbol. Explanation thereof is omitted.

A joint plate 48 is fitted into the joining portion 54 of the body 51 so that the upper and lower surfaces of the joint plate 48 are brought into surface-to-surface contact with the upper and lower surfaces of the joining portion 54. The engaged portions are joined by pressure welding such as cold welding (i.e., joined with pressure), and thereby the body 51 and the crimping member 46 are joined. Thus the intermediary conductor 50 is completed. The welding surfaces 12, 53 are brought into abutting contact with each other, and the first conductor 10 and the intermediary conductor 50 are coaxially joined by cold welding (i.e., joined with pressure). Thereby the first conductor 10 and the body 51 are almost linearly connected in alignment with each other so as to form a bar shape. Thus the intermediary conductor 50 and the first conductor 10 are joined with pressure, so that a connecting structure Cc is formed. The intermediary conductor 50 (crimping portion) and the second conductor 20 are connected (i.e., crimped) in the same manner as the first and second embodiments, and therefore explanation thereof is omitted.

Fourth Embodiment

Figure 8:
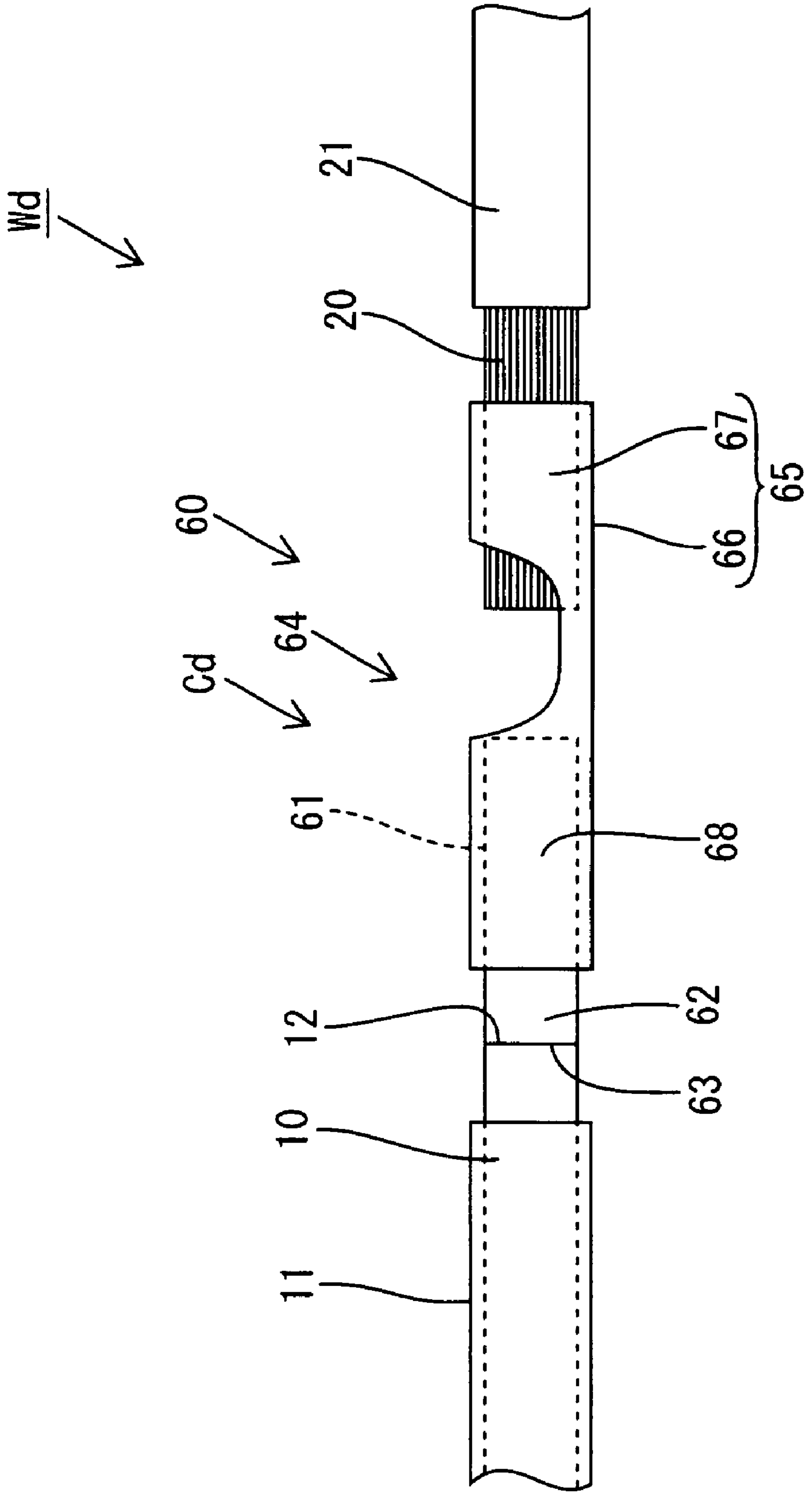
FIG. 8 is a side view of a conductor according to a fourth embodiment.
Figure 9:
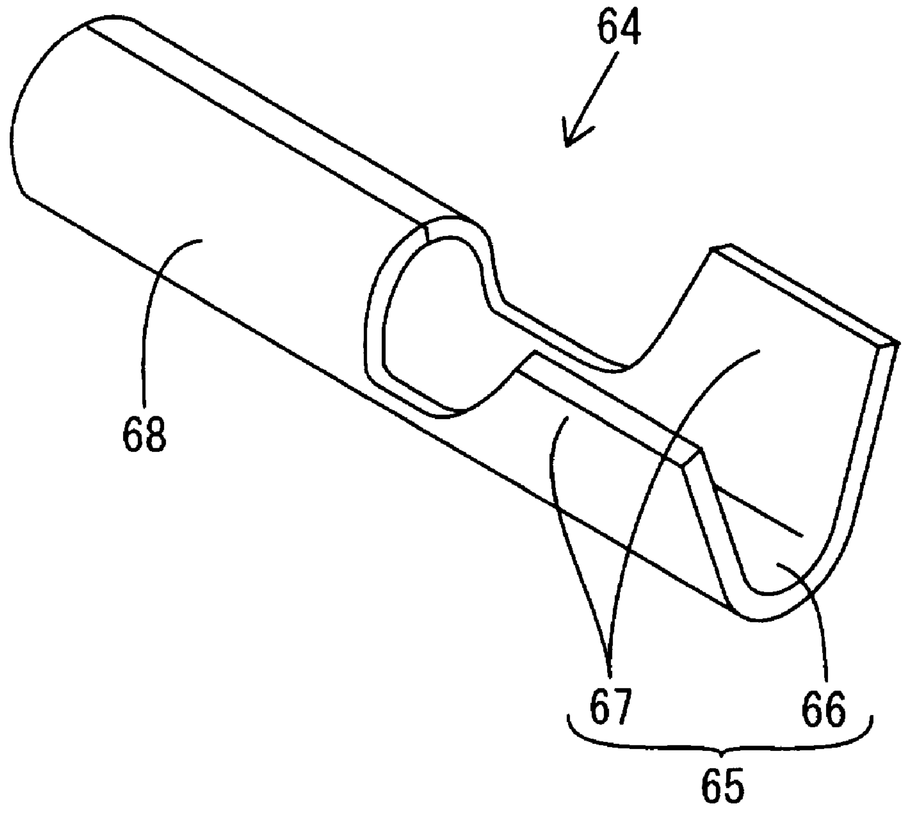
FIG. 9 is a perspective view of a tubular body constituting an intermediary conductor according to the fourth embodiment.

Hereinafter, a fourth embodiment of the present invention will be explained with reference to FIGS. 8 and 9. A first conductor 10 and a second conductor 20 constituting a conductor Wd of the present embodiment are the same as those of the first embodiment, and therefore the same constructions are designated by the same symbols. The operation and effect are also the same as the first embodiment, and therefore explanation thereof is omitted.

An intermediary conductor 60 for connecting between the first conductor 10 and the second conductor 20 includes a bar body 61, which forms a bar shape of a circular cross section as a whole, and further includes a tubular body 64, which is formed as a part separated from the bar body 61 and forms substantially a cylinder shape as a whole. The bar body 61 and the tubular body 74 are both made of similar metals to the second conductor 20, i.e., made of copper alloys. The outer diameter of the bar body 61 is approximately equal to the outer diameter of the first conductor 10. The proximal end portion of the bar body 61 forms a welding portion 62 (corresponding to a welding shaft of the present invention). The end face of the welding portion 62 forms a welding surface 63 (corresponding to a flat surface of the present invention) which is a flat surface substantially at right angles to the axis of (the bar body 61 of) the intermediary conductor 60. The tubular body 64 is formed by bending a board shaped into a predetermined geometry. The tubular body 64 includes an open-barrel crimping portion 65, in which a pair of clamping pieces 67 (corresponding to a clamping portion of the present invention) extend upwardly from the respective lateral side edges of a curved bottom plate 66, and further includes a cylindrical engaging tube 68 contiguous to the bottom plate 66 of the crimping portion 65.

The bar body 61 is coaxially fitted into the engaging tube 68 of the tubular body 64 so as not to jolt. The engaged portions are joined by pressure welding such as cold welding (i.e., joined with pressure), and thereby the bar body 61 is bonded to the tubular body 64. Thus the intermediary conductor 60 is completed. The intermediary conductor 60 is bonded to the first conductor 10 with pressure, so that a connecting structure Cd is formed. The first conductor 10 and the intermediary conductor 60 (bar body 61) are connected (by cold welding) in the same manner as the first to third embodiments. The intermediary conductor 60 (crimping portion 65) and the second conductor 20 are connected (i.e., crimped) in the same manner as the first to third embodiments. Therefore explanation thereof is omitted.

Fifth Embodiment

Figure 10:
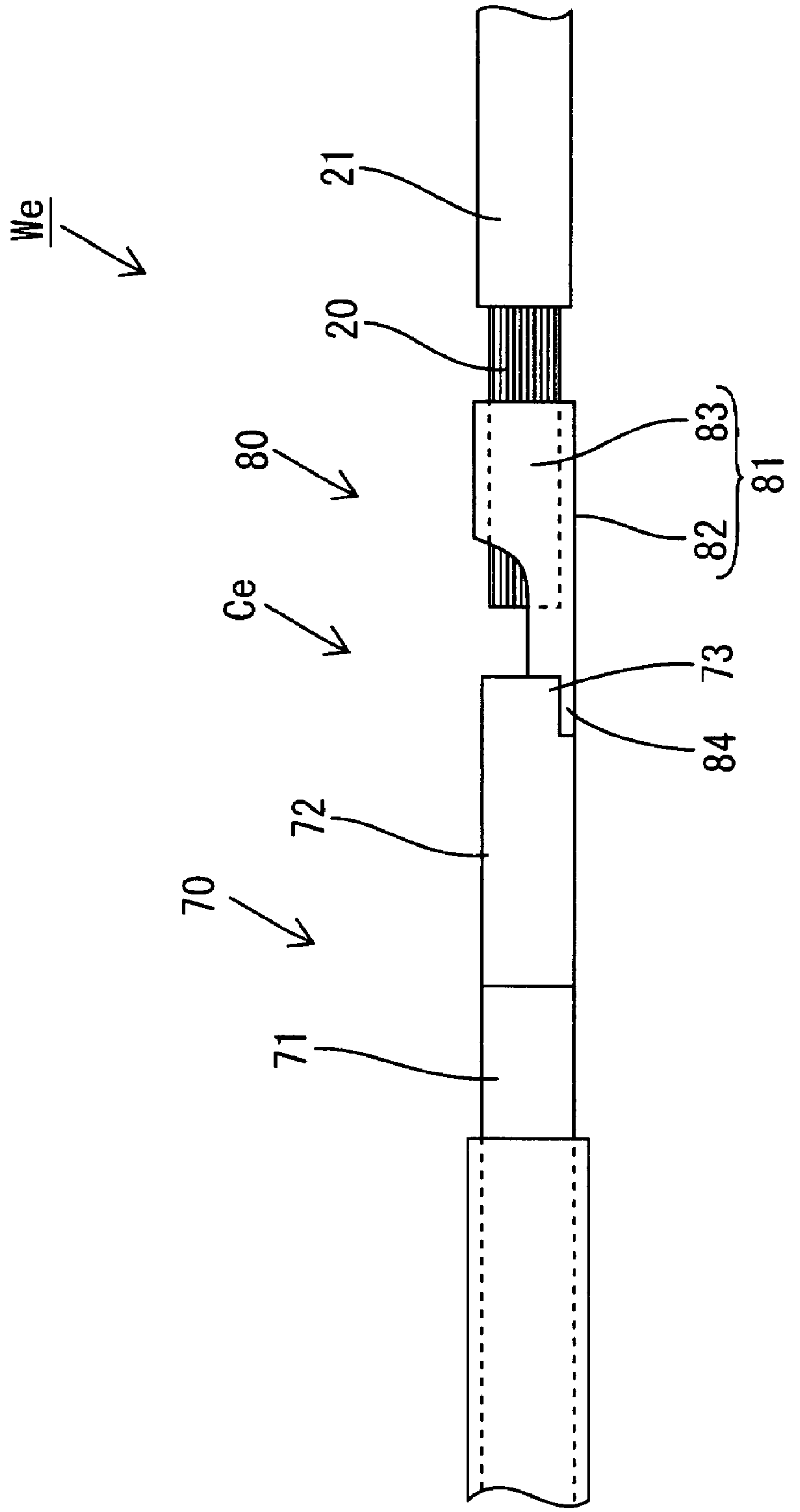
FIG. 10 is a side view of a conductor according to a fifth embodiment.
Figure 11:
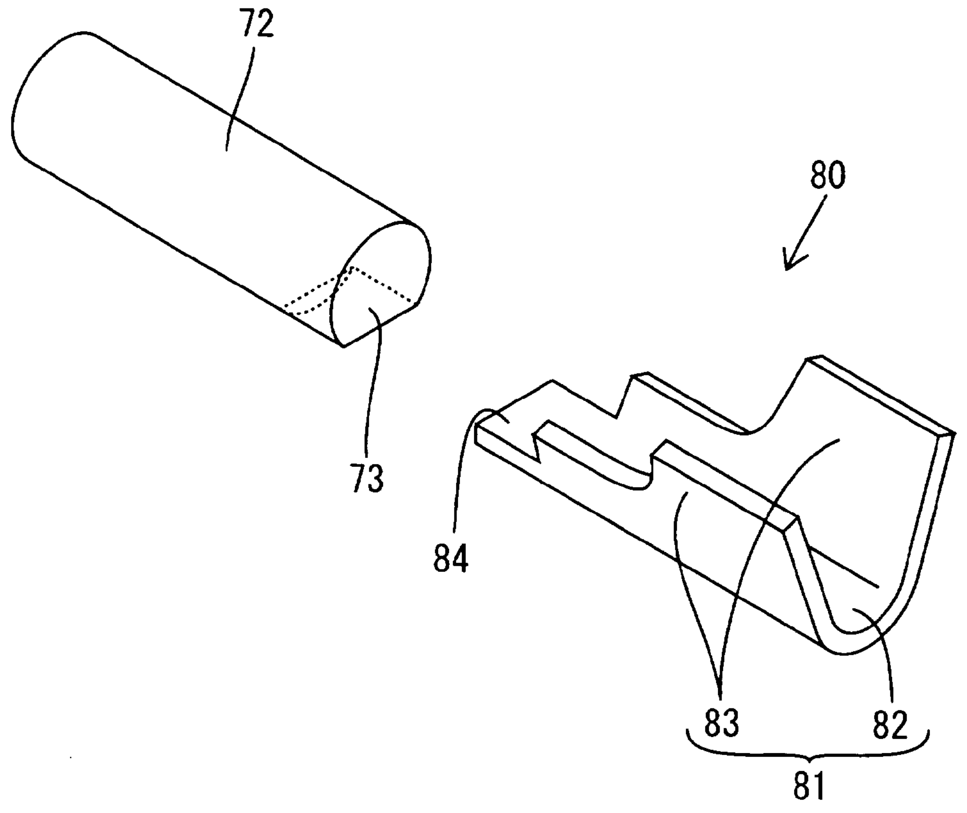
FIG. 11 is a perspective view of a separated state of a first conductor and an intermediary conductor according to the fifth embodiment.

Hereinafter, a fifth embodiment of the present invention will be explained with reference to FIGS. 10 and 11. A second conductor 20 constituting a conductor We of the present embodiment is the same as that of the first to fourth embodiments, and therefore the same constructions are designated by the same symbols. The operation and effect are also the same as the first embodiment, and therefore explanation thereof is omitted.

The first conductor 70 includes a long conductor body 71 and a short bar conductor 72. The conductor body 71 and the bar conductor 72 both have a circular cross section, and the outer diameters thereof are equal to each other. Both are made of aluminum alloys. The end faces of the conductor body 71 and the bar conductor 72 are brought into abutting contact with each other, and joined by pressure welding or the like. Thereby the conductor body 71 and the bar conductor 72 are almost linearly connected (i.e., joined) in alignment with each other. A welding portion 73, which has the same shape as the joining portion 44 of the body 41 of the intermediary conductor 40 according to the second embodiment (i.e., which is formed as a depression), is formed on the end portion of the bar conductor 72 on the opposite side of the conductor body 71. The welding portion 73 includes a welding surface, which is a flat surface substantially parallel to the axial direction of the first conductor 70.

An intermediary conductor 80 is provided as a single component formed by bending a board shaped into a predetermined geometry. The intermediary conductor 80 includes an open-barrel crimping portion 81 (corresponding to a connecting portion of the present invention), in which a pair of clamping pieces 83 (corresponding to a clamping portion of the present invention) extend upwardly from the respective lateral side edges of a curved bottom plate 82, and further includes a welding portion 84 contiguous to the proximal end of the bottom plate 82 of the crimping portion 81. The welding portion 84 has a welding surface, which is a flat surface substantially parallel to the axial direction of the first conductor 70 when connected to the first conductor 70. The intermediary conductor 80 is made of a copper alloy similar to the second conductor 20.

The first conductor 70 and the intermediary conductor 80 are engaged so that the welding surface of the welding portion 84 is brought into surface-to-surface contact with the welding surface of the welding portion 73 of the bar conductor 72. The engaged portions are joined by cold welding or the like (i.e., joined with pressure). Thus the first conductor 70 and the intermediary conductor 80 are joined so as to form a connecting structure Ce. The intermediary conductor 80 (crimping portion 81) and the second conductor 20 are connected in the same manner as the first to fourth embodiments, and therefore explanation thereof is omitted.

In the case that the intermediary conductor is brought into abutting contact with the end face of the first conductor and thereby bonded to the first conductor with pressure, the area of the welding surfaces (abutting surfaces) is limited to the cross sectional area of the first conductor or less. However, according to the present embodiment, the welding portion 84 of the intermediary conductor 80 and the welding portion 73 of the first conductor 70 are joined with pressure so that the flat surfaces substantially parallel to the axis of the first conductor 70 are brought into intimate contact with each other. Therefore the area of the welding surfaces is not limited to the cross sectional area of the first conductor 70. That is, a larger area for pressure welding (or for bonding) can be provided so that bond strength is improved.

Sixth Embodiment

Figure 12:
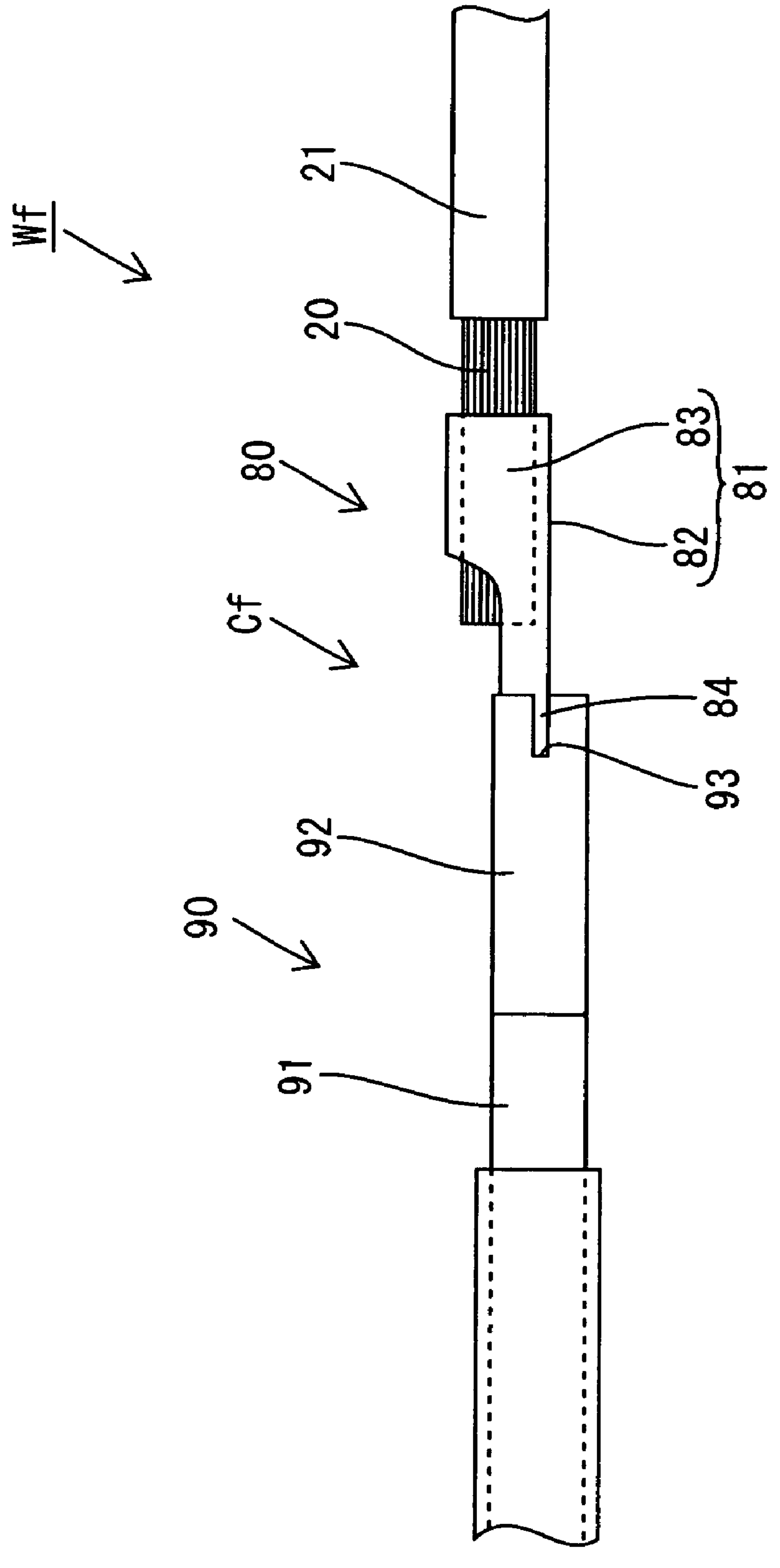
FIG. 12 is a side view of a conductor according to a sixth embodiment.
Figure 13:
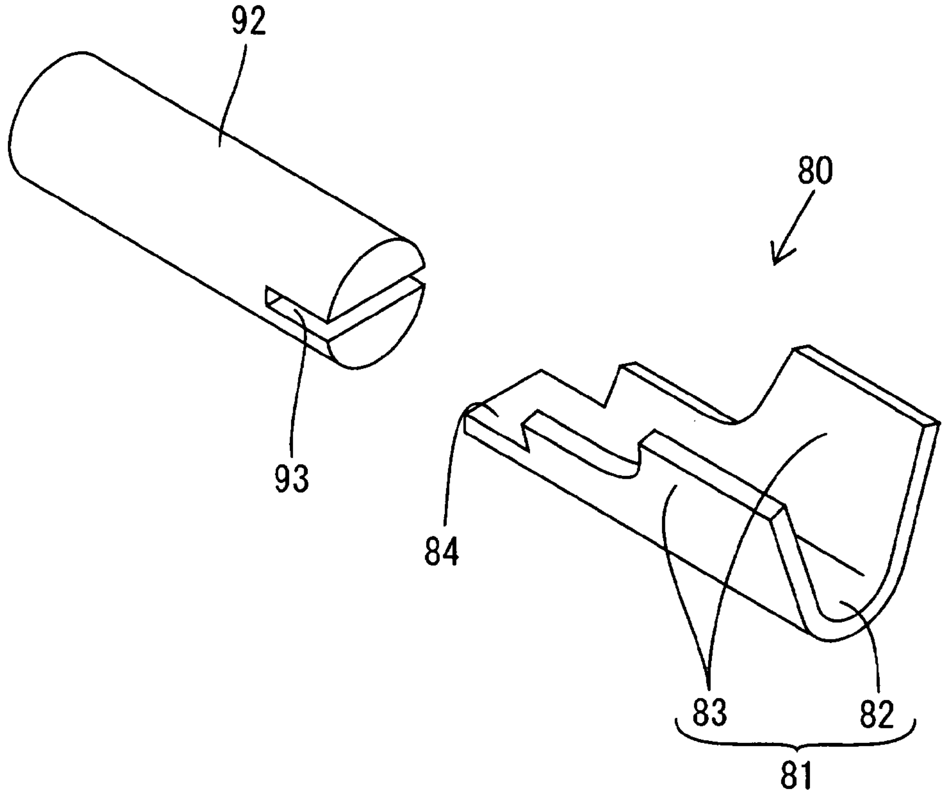
FIG. 13 is a perspective view of a separated state of a first conductor and an intermediary conductor according to the sixth embodiment.

Hereinafter, a sixth embodiment of the present invention will be explained with reference to FIGS. 12 and 13. A second conductor 20 and an intermediary conductor 80 constituting a conductor Wf of the present embodiment are the same as those of the fifth embodiment, and therefore the same constructions are designated by the same symbols. The operation and effect are also the same as the first embodiment, and therefore explanation thereof is omitted. The first conductor 90 includes a long conductor body 91 and a short bar conductor 92. The conductor body 91 and the bar conductor 92 both have a circular cross section, and the outer diameters thereof are equal to each other. Both are made of aluminum alloys. The end faces of the conductor body 91 and the bar conductor 92 are brought into abutting contact with each other, and joined by pressure welding or the like so that the conductor body 91 and the bar conductor 92 are almost linearly connected (i.e., joined) in alignment with each other. A welding portion 93, which has the same shape as the joining portion 54 of the body 51 of the intermediary conductor 50 according to the third embodiment (i.e., which is formed as a slit), is formed on the end portion of the bar conductor 92 on the opposite side of the conductor body 91. The inner surface of the welding portion 93 forms a welding surface, which includes flat surfaces substantially parallel to the axis of the first conductor 90.

The welding portion 84 is fitted into the welding portion 93 of the bar body 92 so that the upper and lower surfaces (i.e., welding surfaces) of the welding portion 84 are brought into surface-to-surface contact with the upper and lower surfaces (i.e., welding surfaces) of the welding portion 93. The engaged portions are joined by pressure welding such as cold welding (i.e., joined with pressure), and thereby the first conductor 90 and the intermediary conductor 80 are joined. The intermediary conductor 80 (crimping portion 81) and the second conductor 20 are connected in the same manner as the first to fifth embodiments, and therefore explanation thereof is omitted. Thus a connecting structure Cf including the first conductor 90 and the intermediary conductor 80 is formed. According to the present embodiment, the welding portion 84 of the intermediary conductor 80 and the welding portion 93 of the first conductor 90 are joined with pressure so that the flat surfaces substantially parallel to the axis of the first conductor 90 are brought into intimate contact with each other, similarly to the fifth embodiment. Therefore the area of the welding surfaces is not limited to the cross sectional area of the first conductor 90, i.e., a larger area for pressure welding (or for bonding) can be provided.

Seventh Embodiment

Figure 14:
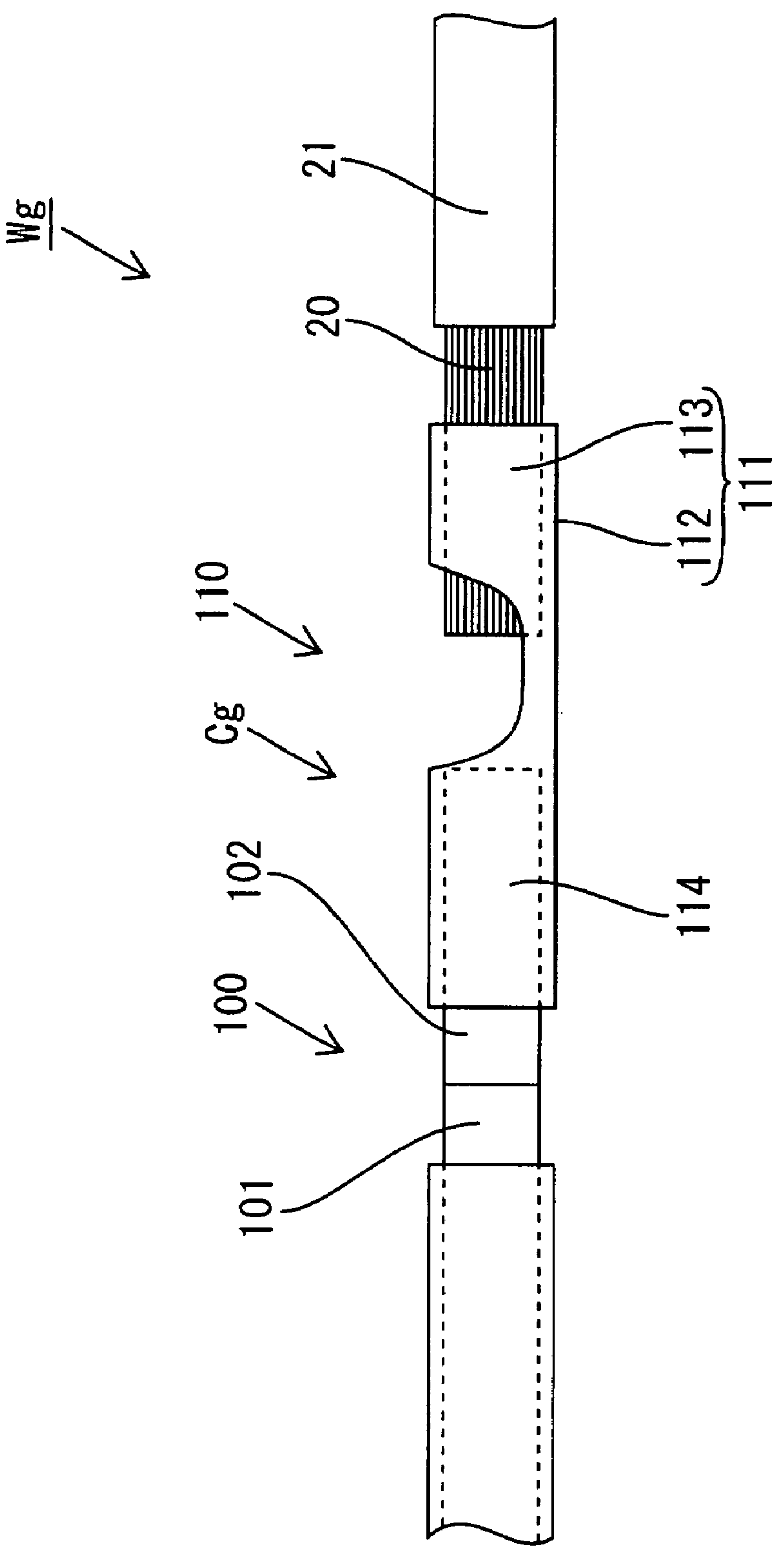
FIG. 14 is a side view of a conductor according to a seventh embodiment.
Figure 15:
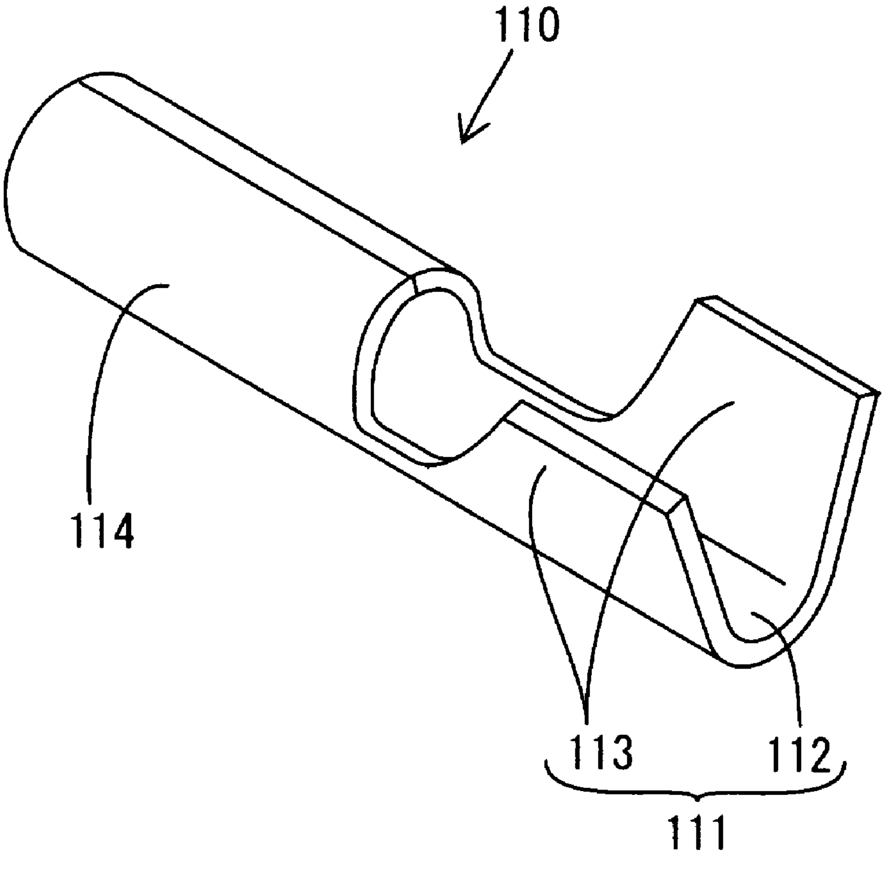
FIG. 15 is a perspective view of an intermediary conductor according to the seventh embodiment.

Hereinafter, a seventh embodiment of the present invention will be explained with reference to FIGS. 14 and 15. A second conductor 20 constituting a conductor Wg of the present embodiment is the same as that of the first to sixth embodiments, and therefore the same constructions are designated by the same symbols. The operation and effect are also the same as the first embodiment, and therefore explanation thereof is omitted.

The first conductor 100 includes a long conductor body 101 and a short bar conductor 102. The conductor body 101 and the bar conductor 102 both have a circular cross section, and the outer diameters thereof are equal to each other. Both are made of aluminum alloys. The end faces of the conductor body 101 and the bar conductor 102 are brought into abutting contact with each other, and joined by pressure welding or the like so that the conductor body 101 and the bar conductor 102 are almost linearly connected (i.e., joined) in alignment with each other.

An intermediary conductor 110 for connecting between the first conductor 100 and the second conductor 20 forms substantially a cylinder shape as a whole, and is made of a similar metal to the second conductor 20, i.e., made of a copper alloy. The intermediary conductor 110 is formed by bending a board shaped into a predetermined geometry. The intermediary conductor 110 includes an open-barrel crimping portion 111 (corresponding to a connecting portion of the present invention), in which a pair of clamping pieces 113 (corresponding to a clamping portion of the present invention) extend upwardly from the respective lateral side edges of a curved bottom plate 112, and further includes a cylindrical welding portion 114 contiguous to the bottom plate 112 of the crimping portion 111.

The bar conductor 102 of the first conductor 100 is coaxially fitted into the welding portion 114 of the intermediary conductor 110 so as not to jolt. The engaged portions (corresponding to the welding portion 114) are joined by pressure welding such as cold welding (i.e., joined with pressure), and thereby the bar conductor 102 is coaxially bonded to the intermediary conductor 110. Thus a connecting structure Cg including the first conductor 100 and the intermediary conductor 110 is formed. The intermediary conductor 110 (crimping portion 111) and the second conductor 20 are connected (i.e., crimped) in the same manner as the first to sixth embodiments, and therefore explanation thereof is omitted.

According to the present embodiment, the welding portion 114 of the intermediary conductor 110 and the bar conductor 102 of the first conductor 100 are joined with pressure so that the peripheral surfaces thereof are brought into intimate contact with each other. Therefore the area of the welding surfaces is not limited to the cross sectional area of the first conductor 100, i.e., a larger area for pressure welding (or for bonding) can be provided.

Eighth Embodiment

Figure 16:
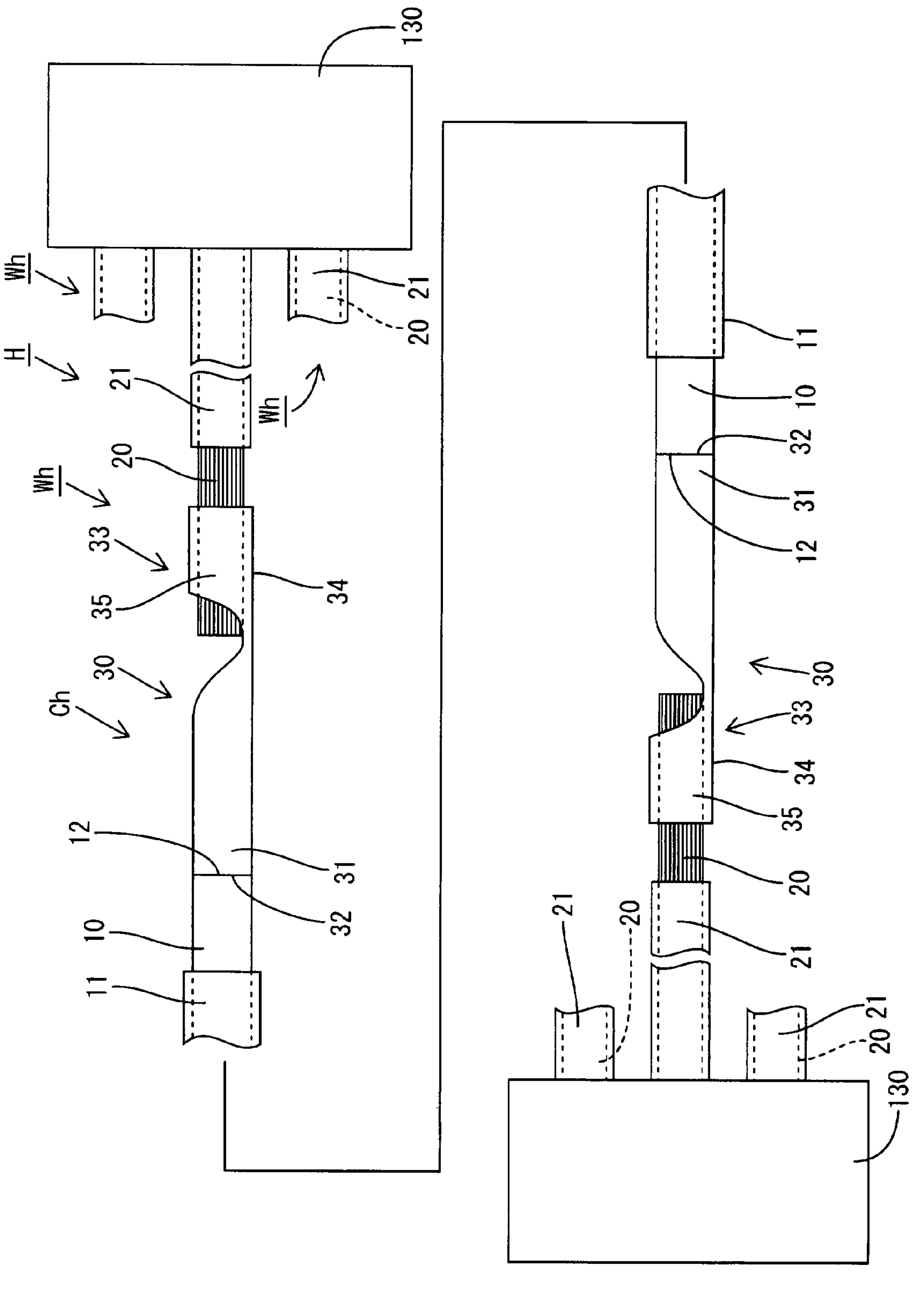
FIG. 16 is a side view of an eighth embodiment.

Hereinafter, an eighth embodiment of the present invention will be explained with reference to FIG. 16. A wire harness H according to the present embodiment includes three conductors Wh bundled into one for cabling. A connector 130 is connected to each end of the conductors Wh. Each conductor Wh includes an elongated first conductor 10 made of an aluminum alloy, and an end of an elongated second conductor 20 made of a copper alloy (i.e., made of a dissimilar metal to the first conductor 10) is connected to each end of the first conductor 10 using an intermediary conductor 30. That is, each conductor Wh includes one first conductor 10, two second conductors 20 and two intermediary conductors 30. The end of each of the second conductors 20 on the opposite side of the intermediary conductor 30 is connected to one of the connectors 130. Specifically, a terminal clamp not shown is connected to the end of each second conductor 20, and the terminal clamp is inserted into the connector 130. A crimping portion, which includes clamping pieces of the same shape as the crimping portion 33 of the intermediary conductor 30, is formed on the proximal end portion of the terminal clamp (i.e., the end portion on the opposite side of the contact portion fitted into the counterpart terminal). The terminal clamp is connected to the end portion of the second conductor 20 by the crimping portion. The first conductor 10, the second conductors 20 and the intermediary conductors 30 have the same constructions as those of the first embodiment, and therefore explanation thereof is omitted.

The wire harness H according to the present embodiment can be used for a propulsion motor circuit connecting among power source components such as a battery, an inverter, or a motor (not shown) in an electric vehicle, for example. In this case, the three first conductors 10 may be inserted into a pipe (not shown) made of a metal (e.g. made of an aluminum alloy), which has a combination of a shielding function and a protective function against foreign object interference. Alternatively, the first conductors 10 may be collectively surrounded (or shielded) with a shield member (not shown) formed of braided wires. Three of the second conductors 20, which are flexible and because of this, are collectively surrounded with a shield member (not shown) formed of braided wires. The first conductors 10 can be arranged in a vehicle body or under and along a vehicle floor. The flexible second conductors 20 can be arranged, for example, in an engine compartment, wherein a cabling path cannot be linearly arranged due to space limitations.

Other Embodiments

The present invention is not limited to the embodiments explained in the above description made with reference to drawings, but the following embodiments may be included in the technical scope of the present invention, for example.

(1) In the above embodiments, the cross sectional areas of the first and second conductors are approximately equal to each other. However, according to the present invention, the cross sectional area of a first conductor may be smaller than that of a second conductor. Alternatively, the cross sectional area of a first conductor may be larger than that of a second conductor.

(2) In the above embodiments, the crimping portion is formed on the intermediary conductor. However, according to the present invention, a crimping portion may be formed on a second conductor.

(3) In the above embodiments, the second conductor is formed of a stranded wire. However, according to the present invention, a second conductor may be formed of a single-core cable similar to the first conductor.

(4) In the above embodiments, the first conductor is made of an aluminum alloy. However, according to the present invention, a first conductor may be made of a metal other than an aluminum alloy.

(5) In the above embodiments, the second conductor is made of a copper alloy. However, according to the present invention, a second conductor may be made of a metal other than a copper alloy.

(6) In the above embodiments, the crimping portion is of an open barrel type. However, according to the present invention, a crimping portion may be in the shape of a hole with a closed back end (i.e., may be of a closed barrel type).

(7) In the above eighth embodiment, the first conductors and the intermediary conductors are in the same shapes as the first embodiment, and joined in the same manner as the first embodiment. However, according to the present invention, a first conductor and an intermediary conductor may be in the same shapes as one of the second to seventh embodiments, and joined in the same manner as the one of the second to seventh embodiments.

(8) In the above embodiments, resin for waterproofing may be molded on the cold-welded portions of the first conductor and the intermediary conductor or of the conductor body and the bar conductor of the first conductor. Alternatively, for waterproofing purposes, the welded portions may be covered with a resin tube with heat shrinkability, for example, which is bonded to the welded portions by heating.

(9) In the above embodiments, a combination of copper alloys is used as similar metals. However, a combination of metals other than copper alloys, between which electrochemical corrosion, i.e., electrical corrosion, will not occur, or will occur to a negligible extent for practical vehicle use or the like, can be used as similar metals.

(10) In the above embodiments, a combination of a copper alloy and an aluminum alloy is used as dissimilar metals. However, a combination of metals other than a copper alloy and an aluminum alloy, between which electrical corrosion will occur to a non-negligible extent for practical use, can be used as dissimilar metals.

The invention claimed is:

1. A conductor to be installed on a vehicle for high current use comprising:
- a single-core aluminum cable;
- a stranded copper wire having flexibility and being connected to an end portion of said single-core aluminum cable; and
- an intermediary conductor made of copper and connected to said stranded copper wire;
- wherein an end face of a core of said single-core aluminum cable is cold welded to a flat welding surface formed on a welding shaft formed on said intermediary conductor and having approximately a same diameter as the core of said single-core aluminum cable.

2. A conductor comprising:
- a first conductor, formed of a single-core cable;
- a second conductor, made of a dissimilar metal to said first conductor; and
- an intermediary conductor, made of a similar metal to said second conductor;
- wherein flat welding surfaces for bonding to each other are formed on an end portion of a core of said first conductor and said intermediary conductor respectively, and said welding surfaces are cold welded to each other so as to be in intimate contact with each other.

3. A conductor as in claim 2, wherein:
- said intermediary conductor includes a welding shaft of approximately a same diameter as the core of said first conductor; and
- a welding surface of said welding shaft and said welding surface of said core are cold welded to each other so as to be in abutting contact with each other.

4. A conductor as in claim 2, wherein:
- a clamping portion is formed on one of said intermediary conductor and said second conductor; and
- said intermediary conductor and said second conductor are connected to each other by deforming said clamping portion so that said clamping portion surrounds the other than the one of said intermediary conductor and said second conductor.

5. A conductor as in claim 4, wherein:
- said welding surfaces are formed on said intermediary conductor and said first conductor respectively as flat surfaces substantially parallel to an axis of said first conductor; and
- said intermediary conductor and said first conductor are joined so that said welding surfaces are in intimate contact with each other.

6. A conductor as in claim 2, wherein:
- said welding surfaces are formed on said intermediary conductor and said first conductor respectively as flat surfaces substantially parallel to an axis of said first conductor; and
- said intermediary conductor and said first conductor are joined so that said welding surfaces are in intimate contact with each other.

7. A conductor comprising a first conductor formed of a single-core cable, to which a second conductor made of a dissimilar metal to said first conductor is to be connected, said conductor further comprising:
- an intermediary conductor made of a similar metal to said second conductor; wherein:
- a connecting portion is formed on one of said intermediary conductor and said second conductor for connecting therebetween; and
- flat welding surfaces for bonding to each other are formed on an end portion of a core of said first conductor and said intermediary conductor respectively, and said welding surfaces are cold welded to each other so as to be in intimate contact with each other.

8. A conductor as in claim 7, wherein:
- said intermediary conductor includes a welding shaft of approximately a same diameter as the core of said first conductor; and
- a welding surface of said welding shaft and said welding surface of said core are cold welded to each other so as to be in abutting contact with each other.

9. A conductor as in claim 7, wherein:
- a clamping portion is formed on one of said intermediary conductor and said second conductor; and
- said intermediary conductor and said second conductor are connected to each other by deforming said clamping portion so that said clamping portion surrounds the other than the one of said intermediary conductor and said second conductor.

10. A conductor as in claim 9, wherein:
- said welding surfaces are formed on said intermediary conductor and said first conductor respectively as flat surfaces substantially parallel to an axis of said first conductor; and
- said intermediary conductor and said first conductor are joined so that said welding surfaces are in intimate contact with each other.

11. A conductor as in claim 7, wherein:
- said welding surfaces are formed on said intermediary conductor and said first conductor respectively as flat surfaces substantially parallel to an axis of said first conductor; and said intermediary conductor and said first conductor are joined so that said welding surfaces are in intimate contact with each other.

12. A wire harness comprising:

a first conductor elongated and formed of a single-core cable;

an intermediary conductor made of a dissimilar metal to said first conductor and including a flat welding surface for bonding to a flat welding surface formed on an end portion of a core of said first conductor, said welding surfaces being cold welded to each other so as to be in intimate contact with each other;

a second conductor including a stranded core made of a similar metal to said intermediary conductor and being connected to said intermediary conductor; and a terminal clamp provided on an end portion of said second conductor on an opposite side of said intermediary conductor.

13. A wire harness as in claim 12, wherein said second conductor and said terminal clamp are provided on each end of said first conductor via said intermediary conductor.

* * * * *